(12) United States Patent
Balasubramanian et al.

(10) Patent No.: US 11,669,788 B2
(45) Date of Patent: Jun. 6, 2023

(54) METHOD AND APPARATUS FOR MANAGING A TASK AND PROJECT MESSAGING SYSTEM

(71) Applicant: Walmart Apollo, LLC, Bentonville, AR (US)

(72) Inventors: Mahalakshmi Balasubramanian, Karnataka (IN); Siddhant Medewar, Karnataka (IN)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/014,298

(22) Filed: Sep. 8, 2020

(65) Prior Publication Data

US 2021/0073713 A1    Mar. 11, 2021

(30) Foreign Application Priority Data

Sep. 5, 2019 (IN) .............................. 201911035726

(51) Int. Cl.
*G06Q 10/06* (2023.01)
*G06Q 10/0631* (2023.01)
*G06F 3/04817* (2022.01)

(52) U.S. Cl.
CPC . *G06Q 10/063114* (2013.01); *G06F 3/04817* (2013.01); *G06Q 10/06312* (2013.01); *G06Q 10/06316* (2013.01)

(58) Field of Classification Search
CPC .................................................. G06Q 10/06
See application file for complete search history.

(56) References Cited

U.S. PATENT DOCUMENTS

| | | | | |
|---|---|---|---|---|
| 2012/0311585 | A1* | 12/2012 | Gruber | H04W 4/02 718/100 |
| 2013/0212583 | A1* | 8/2013 | Gordon | G06Q 10/06 718/100 |
| 2014/0208325 | A1* | 7/2014 | Chen | G06Q 10/107 718/102 |
| 2016/0224939 | A1* | 8/2016 | Chen | G06Q 10/06311 |
| 2017/0083179 | A1* | 3/2017 | Gruber | G06Q 10/06311 |
| 2017/0249574 | A1* | 8/2017 | Knijnik | G06Q 10/06313 |
| 2018/0232259 | A1* | 8/2018 | Chowdhury | G06F 9/4881 |
| 2019/0138583 | A1* | 5/2019 | Silk | G06F 40/18 |
| 2019/0334907 | A1* | 10/2019 | Rodden | G06Q 10/063116 |
| 2020/0380992 | A1* | 12/2020 | Lukens | G10L 15/22 |

* cited by examiner

*Primary Examiner* — Kurtis Gills
(74) *Attorney, Agent, or Firm* — Fitch, Even, Tabin & Flannery LLP

(57) ABSTRACT

Systems and methods for providing a project manager with a configurable platform from which to oversee the status of a project are discussed. A project management application provides a project manager with a granular oversight of individual tasks and a view of task dependencies in a sequence of tasks during a project's execution. A dashboard graphical user interface (GUI) provides graphical depictions of dynamically updated individual task status, group task status and overall project status that are viewable by both project managers and individuals assigned to perform tasks. Processing time associated with sending task notifications and reminder messages to individuals about their assigned tasks that have not been completed and/or acknowledged is reduced.

16 Claims, 10 Drawing Sheets

| Show 10 ▼ Entries 701 | Upcoming Tasks 703 | | | | | | Search 705 | Export as Spreadsheet 707 | |
|---|---|---|---|---|---|---|---|---|---|
| Task ID 709 | Activity 711 | Start Date 713 | Start Time 715 | Status 717 | Doer 719 | Stream 721 | Track 723 | Mandatory 725 |
| 1 | ID required of HOV associate ONE TIME ACTIVITY - As and When Required in case of Increase or change in employee | 01/12/2019 | 10:00:00 | Acknowledge | Name 1 | Finance-AP | Gajender | 0 |
| 4 | Inform vendor HOV to configure the scanner for SAP Rollout Store(Exitisting Store) | 02/26/2019 | 10:00:00 | Acknowledge | Name 1 | Finance-AP | Gajender | 0 |
| 5 | Sales: Data for all Historical tax conditions records to be created and Uploaded - FIRST | 03/28/2019 | 10:00:00 | Escalated | Name 2 | Finance-Tax | Gajender | 0 |
| 6 | Sales: Validation of the SAP Log file against the Historical tax conditions uploaded | 03/23/2019 | 10:00:00 | Escalated | Name 2 | Finance-Tax | Gajender | 0 |
| 7 | Sales : Prepare and Upload Current Tax conditions data. SECOND i.e. only after historical records are uploaded in SAP and nos, confirmed on POS | 03/23/2019 | 10:00:00 | Escalated | Name 2 | Finance-Tax | Gajender | 0 |
| 8 | SALES: Creating and uploading of Ab Cess related tax record data for Sales. This activity to start only once the new articles are available in SAP based on article report | 03/23/2019 | 10:00:00 | Escalated | Name 2 | Finance-Tax | Gajender | 0 |
| 9 | PURCHASE: Creating and uploading of Ab Cess related data for Purchase. This activity to start only once the new articles are available from SAP. | 02/26/2019 | 10:00:00 | Escalated | Name 2 | Finance-Tax | Gajender | 0 |
| 10 | Validation of the SAP Log file against the ab cess tax conditions uploaded | 02/26/2019 | 10:00:00 | Escalated | Name 2 | Finance-Tax | Gajender | 0 |
| 11 | Uploading the incremental Tax data for any changes or additions in control codes. Purchase and sales as per defined process above. | 02/26/2019 | 10:00:00 | Escalated | Name 2 | Finance-Tax | Gajender | 0 |
| 12 | Purchase: Data for all Historical tax conditions that have already ended to be prepared and uploaded | 02/26/2019 | 10:00:00 | Escalated | Name 2 | Finance-Tax | Gajender | 0 |

Previous 1 2 3 4 5 ... 36 Next

FIG. 7

METHOD AND APPARATUS FOR MANAGING A TASK AND PROJECT MESSAGING SYSTEM

CROSS-REFERENCE TO RELATED PATENT APPLICATIONS

This Application claims priority to Indian Patent Application No. 201911035726 filed Sep. 5, 2019, and entitled Method and Apparatus for Managing a Task and Project Messaging System, the contents of which are incorporated herein by reference in their entirety.

BACKGROUND

Project management systems track the progress of tasks associated with a given project such as by tracking the progress of individuals responsible for completing a task assigned to them. Project management systems conventionally are run by a manager of the project who schedules workers to begin working on a project and monitors their progress. The project manager may use the project management systems to also send reminder notifications to individuals regarding a task to be completed.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings:

FIG. 7 is a project task list GUI according to an exemplary embodiment.

DETAILED DESCRIPTION

The project management system provided by the embodiments disclosed herein provides a project manager with a configurable platform from which to oversee the status of a project. More particularly embodiments provide a project manager with a granular oversight of individual tasks and a view of task dependencies in a sequence of tasks during a project's execution. A dashboard graphical user interface (GUI) provides graphical depictions of dynamically updated individual task status, group task status and overall project status that are viewable by both project managers and individuals assigned to perform tasks. Further, embodiments reduce the processing time associated with sending task notifications and reminder messages to individuals about their assigned tasks that have not been completed and/or acknowledged.

In one embodiment, a dashboard GUI may be dynamically updated based on a project management application that periodically tracks response e-mail messages that have been sent to a designated e-mail account associated with a project from an individual assigned to perform a project task. The response emails are sent in response to notification or reminder emails sent from the project manager and indicate either an acknowledgement of a task assignment or a completion of the task. The project management system dynamically updates a project listing and associated dashboard GUI based on the latest data.

Figure 1:
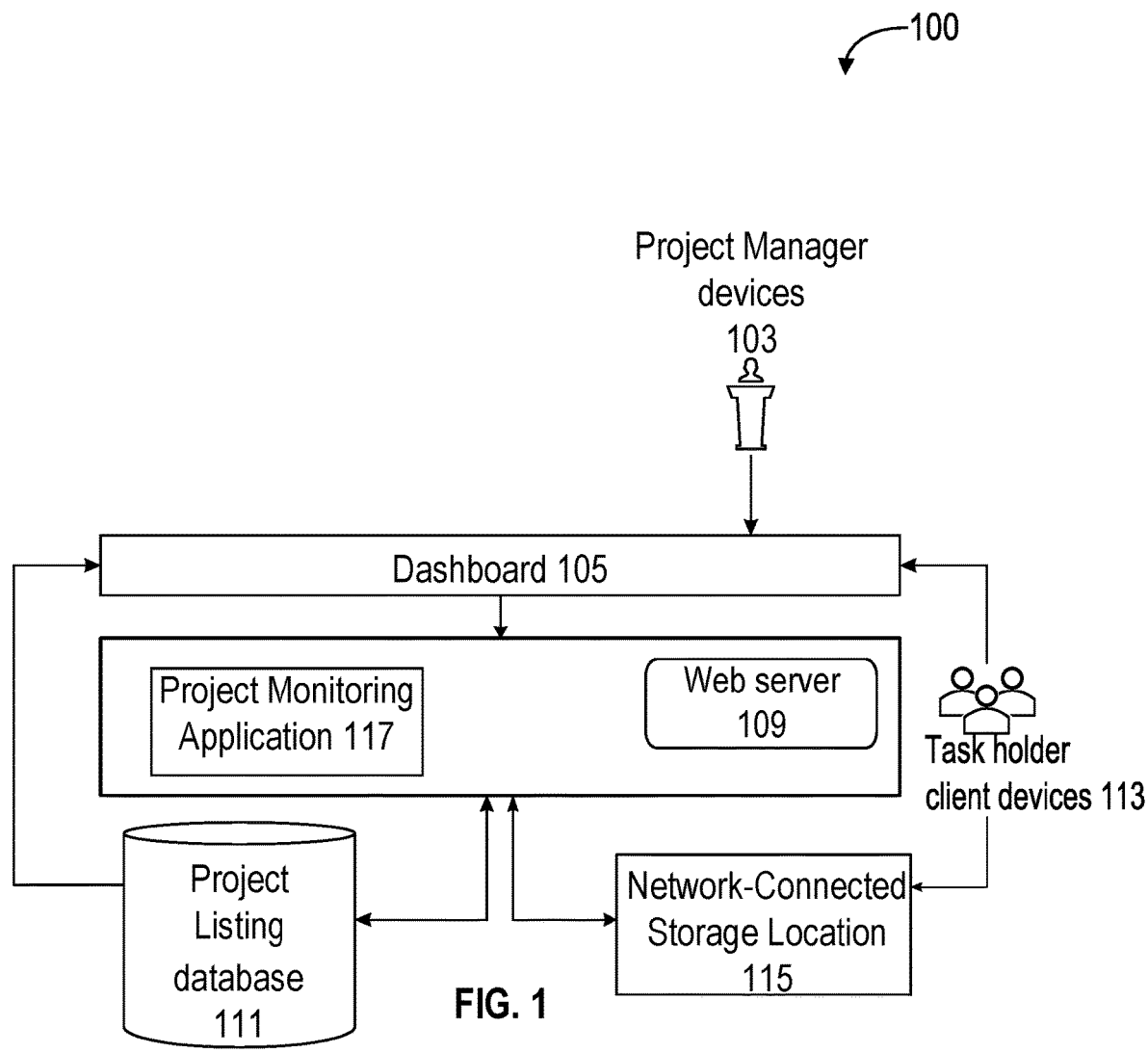
FIG. 1 is a block diagram of a project management system, according to an exemplary embodiment.

FIG. 1 is a block diagram of a project management system 100 according to an exemplary embodiment. In the system project manager client devices 103 and task holder client devices 113 (devices operated by individual's assigned to perform project tasks) both provide access via a web browser executing on their respective client devices to the dashboard GUI 105 generated by project monitoring application 117 (with the aid of hosting web server 109). Project management system 100 further includes network storage location 115, such as, but not limited to, an email server with a designated email inbox assigned to a project. In one embodiment, the email inbox is provided via Microsoft Outlook®. Additionally, project management system 100 includes project listing 111 which holds a listing of all of the tasks and task dependencies in the project. Project listing 111 holds project data and may be implemented as, but is not limited to, a formal database or may be implemented as a spreadsheet provided by a spreadsheet program such as Microsoft Excel®.

Project manager client devices 103 and task holder client devices 113 may be, but are not limited to, desktop computers, laptop computers, and mobile devices such as phones, tablets, or personal data assistants (PDAs). Project manager client devices 103 may be used by project managers to provide browser-based access to the dashboard GUI 105 to initiate and oversee the status of assigned project tasks. Task holder client devices 113 can be used by individuals in the project to access GUI 105 and view information of all the tasks in a project. In an alternative embodiment task holder client devices 113 may only enable access to the individual's own assigned task.

In one embodiment, a project manager launches a web browser and logs onto the web page holding the dashboard GUI 105. The project manager logs on as an administrator by providing appropriate credentials and providing the cutover file path indicating the relevant project listing 111. In one embodiment, the cutover file path may identify an Excel spreadsheet listing project tasks and their related dependencies. Once the project manager is logged in, the dashboard GUI 105 displays a selectable initiation button enabling the project manager to officially launch the project. It will be appreciated that in other embodiments, other GUI tools other than a button may also be used to initiate the launching of the project. Once the project is initiated, the project monitoring application scans the cutover file to determine tasks ready to be triggered for the project and sends notification emails to individuals assigned to the tasks and updates the cutover file accordingly. An additional copy of the notification may also be sent to a project manager of the individual or another member assigned to the same project group as the task holder. In one embodiment, the tasks are ready to be triggered if the cutover file indicates that all the preceding tasks upon which the task depends are complete and the start time and start date are not in the future. The emails may contain links which when selected generate a response email sent to a specific folder associated with the project that indicates that the assigned individual has acknowledged the task or has completed the task. The response email may include a task ID associated with the signed task, Following the initial notification, the project monitoring application repeatedly scans the project specific folder in a network-connected storage location such as an email folder for emails related to the assigned tasks such as by identifying task IDs included in the response email or subject line. The project monitoring application updates the project listing when new data is found. In the absence of a response the project monitoring application may also send reminder emails to the task holders at intervals set by the project manager. The interval for the reminder emails is customizable and emails may increase in frequency the longer a task is overdue. The reminder emails may also be paused upon the project manager's command entered via dashboard GUI 105. For example, the project manager may pause the reminders overnight.

In an embodiment, the determination of which tasks are ready to be triggered depends on each task's task dependency. For example, the project listing may indicate that a second task may only be performed after completion of a first task and a fourth task may require the first and second tasks to be first completed.

In an embodiment, the project manager can access project listing 111 which may enable the project manager to assign tasks to an individual, reassign tasks from one individual to another individual, send initial e-mails to individuals' e-mail accounts with instructions to begin working on a task, and send reminder e-mails to the individuals' e-mail accounts to respond to the initial e-mails. The project monitoring application 117 may reflect any changes to the project listing in response to a command by the project manager by changing a time by which the individual has to complete the task or changing a time by which the individual has to begin working on the task. The project monitoring application 117 may also reflect the re-assignment of the individual charged with completing the task, updates to the status of the task, and assignment of a task identifier (ID) to the task, in response to a project manager making changes in project listing 111. The project monitoring application 117 can also reflect any changes to the assignment or reassignment of one or more tasks to different groups if the status of the tasks displayed on the dashboard GUI indicates that a particular group is falling behind schedule. In some embodiments, the project monitoring application 117 can also reflect a reassignment of an individual to a different group to help balance the load of tasks when a given group is operating above capacity and requires additional resources (e.g., additional individuals).

Task holders (the individuals to whom project tasks are assigned) can view the dashboard GUI 105 to view information retrieved from project monitoring application 117. For example, the dashboard GUI can display information about tasks assigned to the individual. The information can include a time by which the task should be completed, a time at which the task should be started, a status of the task, and a group that the task belongs to. The information may also include a task ID as well. In one embodiment, project monitoring system 100 includes project monitoring application 117 executing on a server containing one or more processors configured to execute instructions. Project monitoring application 117 generates dashboard GUI 105 which is provided via a web page hosted by web server 109. The instructions for project monitoring application 117 may be stored on a hard disk and/or memory and may be implemented as an executable file which when executed launches a browser with a homepage that project managers and task holders can access.

If the individual task holder does not respond to the notification e-mail within a specified time, project monitoring application 117 can send reminder e-mails with an indication of "Reminder" and/or "Escalation" included in the subject line and/or the body of the e-mail to the e-mail account associated with the individual. Project monitoring application 117 may update the project listing 111 as mentioned above and may maintain a log of the reminder e-mails sent to the individual. The log can contain the same information that is logged in the project listing 111. This information may be captured on dashboard GUI 105 so that project managers and task holders can access this information without having to access project listing to view the status of a task. In some embodiments, the project listing can also be saved in a common folder such as any One Drive folder where project monitoring application 117 can read and write to the project listing 111.

Figure 2:
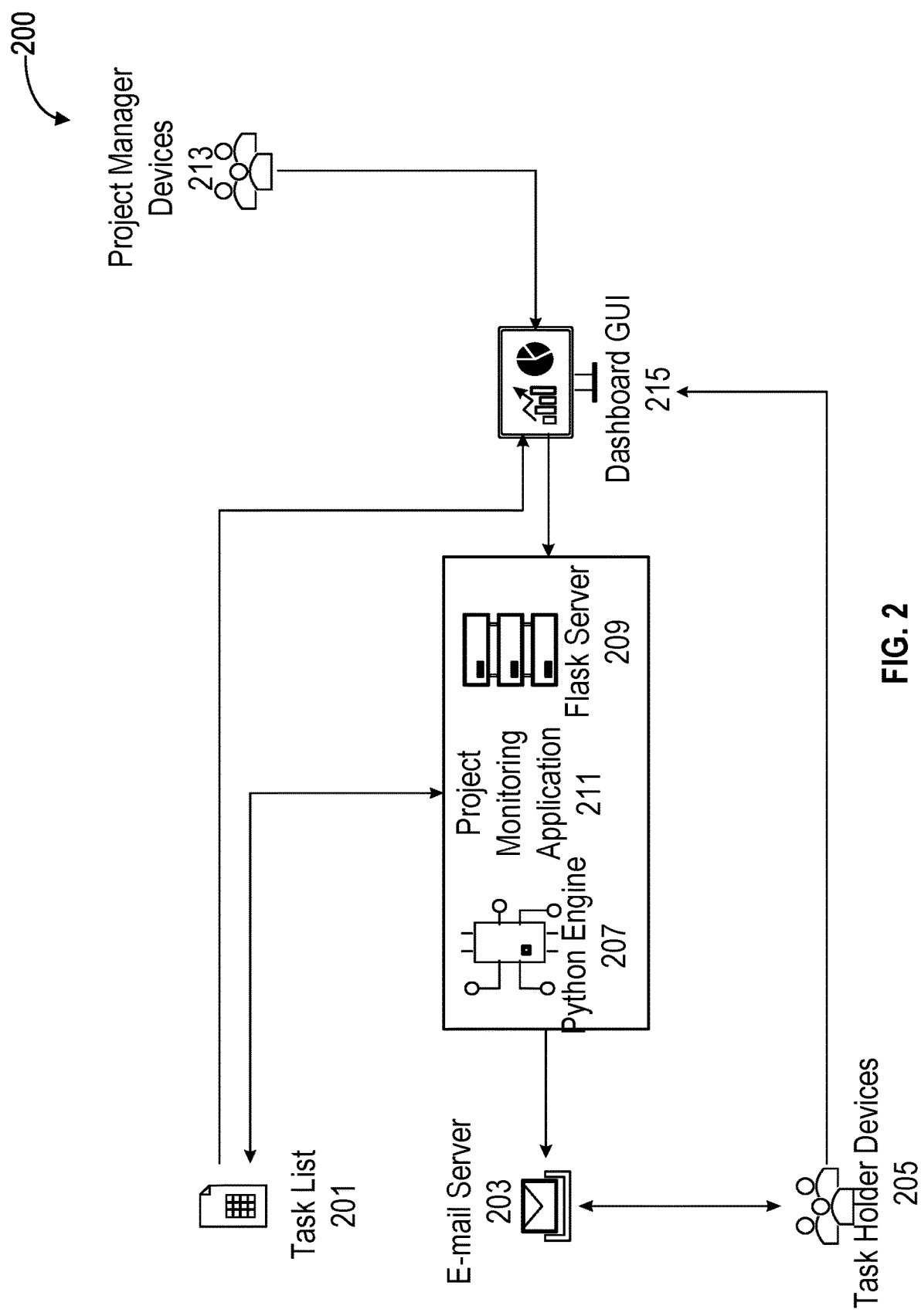
FIG. 2 is a block diagram of a project management system, according to an exemplary embodiment.

FIG. 2 is a block diagram of a project management system, according to an exemplary embodiment. Exemplary project monitoring system 200 includes project monitoring application 211. Project monitoring system 200 may include Python™ engine 207 and Flask™ server 209. Project monitoring application 211 may be written in Python™ using multiple libraries and may read Microsoft Outlook® folders in email server 203, read and update Excel® files in task list 201 and send emails. Flask™ provides a micro web framework that creates a local server, Flask™ server 209 that hosts webpages enabling the display of dashboard GUI 105. The micro web framework provides a bridge between back-end and frontend to facilitate data movement. In one embodiment, HTML and CSS may be used for scripting and styling the webpages holding the dashboard GUI 215. JavaScript may be employed to enable client-side scripting and to provide a set of libraries to demonstrate graphical representations in dashboard GUI 215 on the webpage. Project manager device 213 and task holder devices 205 may provide web browsers enabling access to dashboard GUI 215.

Figure 3:
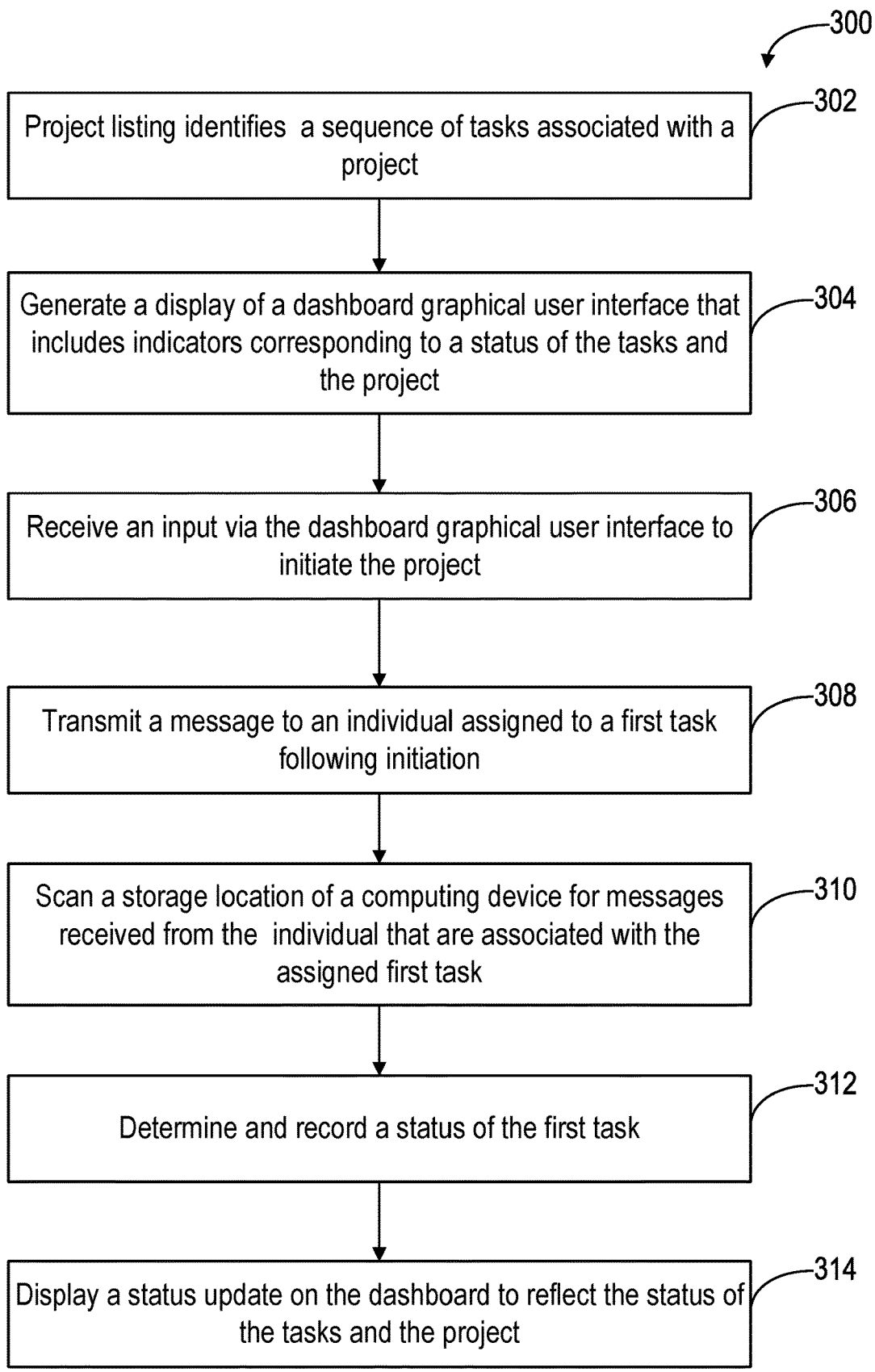
FIG. 3 is a flowchart of a sequence of steps for performing project management with the project management system in an exemplary embodiment.

FIG. 3 is a flowchart of a sequence of steps for performing project management with the project management system in an exemplary embodiment. The sequence 300 begins at block 302, by providing a sequence of tasks associated with a project in a project listing. At block 304, the project monitoring application can generate a display of a dashboard graphical user interface that includes indicators corresponding to a status of the tasks and/or the project. At block 306 the project monitoring application can receive input via the dashboard graphical user interface to initiate a project. For example, a project manager can click an indicator in the dashboard GUI to initiate the project. At block 308 the project monitoring application can transmit a message (e-mail) to at least one e-mail account associated with an individual (individual) that is assigned to a first task in the project following initiation. At block 310 the project monitoring application can scan a designated location (e.g., a network-connected storage location) of a computing device for messages (e-mails) received from the individual task holder that is associated with the assigned first task. The project monitoring application can periodically scan the network-connected storage location at defined time periods. That is project monitoring application 310 can scan an inbox of an e-mail account associated with project monitoring application 310, on network-connected storage location 115, for e-mails received from e-mail accounts associated with the individual task holder or emails containing a particular task ID. The e-mails are acknowledgment e-mails of receipt of the task, or e-mails indicating that a task has been completed. At block 312 the project monitoring application can determine and record a status of the first task in the project listing. The project monitoring application can also determine and update the current status of the other tasks in the project listing that are dependent upon the first task. Any necessary reminder and escalation emails may also be iteratively sent. At block 314 the project monitoring application can display a status update on the dashboard GUI to reflect the status of the first task and/or the project.

In one embodiment, the project monitoring system described herein may provide significant email network and storage efficiencies when performing task processing. Conventional project monitoring systems may send reminders on a recurring basis at a certain frequency (e.g., daily, weekly, intraweek, monthly) which is determined solely by the project manager. Because these conventional systems do not include any intelligence to determine when an e-mail has been received in response to the reminder e-mails, the recurring e-mail programs can continue to send e-mails after they are no longer necessary. Although sending a reminder e-mails to a single e-mail account may not result in any significant increase in storage use, when reminder e-mails are sent to tens or hundreds of e-mail accounts the amount of storage required to store the outbound reminder e-mails sent from the server, or partition of a server, increases substantially. The amount of storage required to store outbound e-mails may increase even more depending on the number of tasks assigned to people. For example, if there is an average of 50 tasks assigned to each of 10 individuals and reminder e-mails are sent to each of the 10 individuals, the number of emails sent and stored may quickly increase. Furthermore, it becomes increasingly difficult to search through an e-mail account for a particular e-mail as the number of e-mails in the account increases. As the number of e-mails in the account increases so does the amount of time needed to search for a specific e-mail. This issue is further compounded when there are multiple projects, each of which included multiple tasks that require reminder e-mails to be sent individuals who are assigned to the tasks.

Further, because existing recurring e-mail programs do not factor in the completion of the sequence of tasks, the programs send reminder e-mails solely based on the expiration of a timer. Accordingly, these programs will send reminder e-mails to e-mail accounts associated with the individuals who are supposed to complete tasks without taking into account the fact that certain tasks have to be completed before others can be started. As a result, multiple reminder e-mails that do not need to be sent will be sent to individuals whose tasks cannot be completed because the tasks that precede their tasks have not been completed. These additional e-mails result in unnecessary network traffic and increased storage requirements.

The project management system described herein sends an initial e-mail to an account to instruct a person to begin working on a task, but only after any preceding task in the sequence is completed, and will send reminder e-mails based on reminder settings specified by the project manager after the initial e-mail. As a result, fewer e-mails will be sent to e-mail accounts because the reminder e-mails will not be sent to all of the e-mail accounts, but rather only to the e-mail accounts where a task has been assigned to an individual and has been authorized to be completed. A task is authorized to be completed only after all of its task dependencies have been satisfied.

Figure 4:
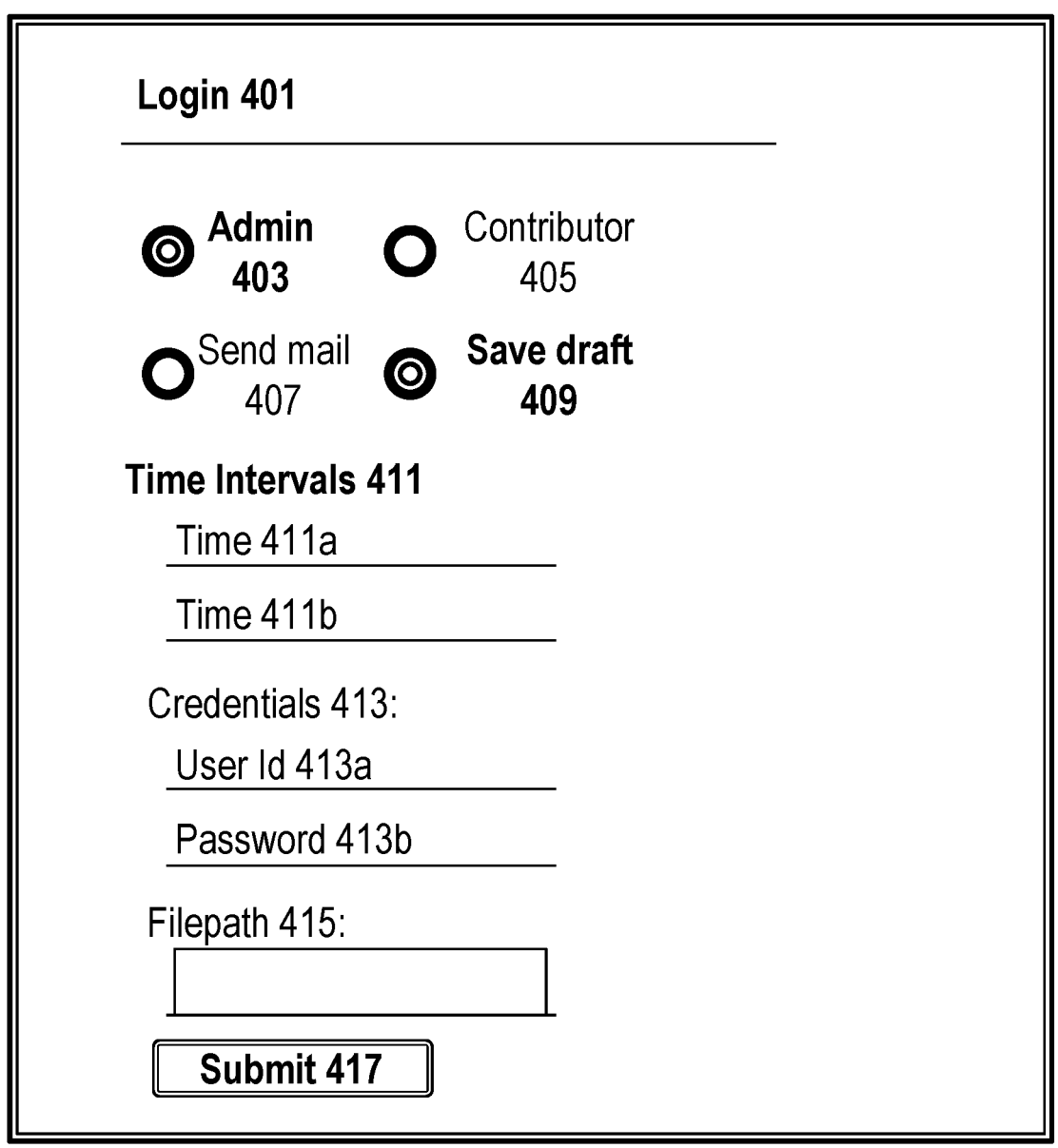
FIG. 4 is a project management system login graphical user interface (GUI), according to an exemplary embodiment.

FIG. 4 is a project management system login graphical user interface (GUI), according to an exemplary embodiment. Login GUI 400 is part of a login page that includes a plurality of radio buttons and fields that receive information input by either a task holder individual or project manager regarding a particular task. For example, login 401 includes an administrator radio button (admin 403) that indicates that the information input into the field credentials 413 must correspond to login credentials for a project manager. Login 401 also includes a contributor radio button (contributor 405), send mail radio button (send mail 407), and/or a save draft radio button (save draft 409). The contributor radio button can allow a user to login as anyone other than a project manager. The send mail radio button is a radio button that can cause the project monitoring application to generate a display of a subject line and body of an e-mail to send an e-mail. In some embodiments, when send mail 407 is selected, the project monitoring application can cause an e-mail application to launch in a network-connected storage location (e.g., network-connected storage location 115) thereby providing the user with the ability to send an e-mail using their e-mail account on the network-connected storage location. Save draft 409 enables a user to save a draft of the information entered into login 401.

When admin 403 is selected time intervals 411, credentials 413, and file path 415 are rendered by the dashboard GUI. Time intervals 411 include time 411a which is the time interval at which a reminder e-mail is to be sent to an individual's e-mail account after an initial e-mail is sent from the project manager's e-mail account to the individuals e-mail account. The project manager can record this time in time 411a. Time intervals 411 include time 411b which is the time interval at which an additional e-mail is to be sent to the individual's e-mail account after the reminder e-mail is sent from the project manager's e-mail account to the individual's e-mail account. An escalation e-mail can also be sent a certain intervals. The escalation e-mail can include the word "Escalation" in the subject line. Credentials 413 may include user id 413a and password 413b. User id 413a is a user identifier that identifies an account associated with the project manager, and password 413b is the password that corresponds to the account associated with the project manager.

File path 415 is a field that can receive text corresponding to a file path to a directory that includes the project listing of the tasks and their related dependencies. Once the data from the project listing is retrieved, the project monitoring application may build the dashboard GUI. These different pages are described below in FIGS. 5-9.

Figure 5:
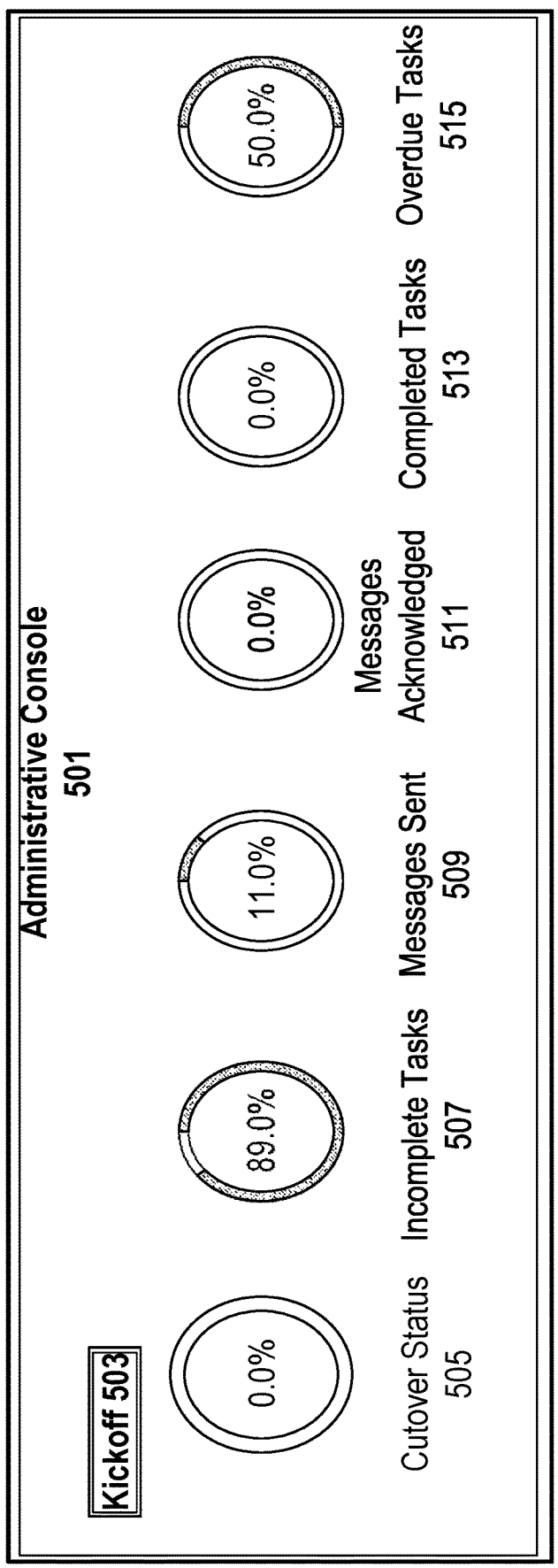
FIG. 5 is a project status GUI, according to an exemplary embodiment.

FIG. 5 is a project status graphical user interface (GUI), according to an exemplary embodiment. Administrative Console 501 is a webpage rendered for the dashboard GUI that includes information about a project that includes multiple tasks. This page may be rendered after submit button 417 is clicked. Administrative Console 501 includes an icon, kickoff 503, that once clicked causes the project monitoring application to initiate checking the status of tasks and determine, if any reminder e-mails have been sent/need to be sent to the task holder individuals. The project monitoring application will also check to see if any escalation e-mails have been sent to these e-mail accounts as well. The project monitoring application will also check to see if e-mails have been received from the e-mail accounts associated with the task holding individuals acknowledging that a task has been assigned to the individuals or that the task has been completed by the individual. The project monitoring application can determine whether an e-mail contains information indicating that the task has been completed and/or acknowledged by examining the e-mails as explained above.

Administrative Console 501 may further include an icon representing the status of a project indicated by cutover status 505. Cutover status 505 represents the percentage of a project that is complete. Because a project is a combination of tasks that must be completed in order for the project to be complete, cutover status 505 can also represent the completion of total tasks associated with the project. In this instance the percentage value displayed in cutover status 505 will be identical to the percentage value in completed tasks.

Incomplete tasks 507 are an icon representing the percentage of tasks that are incomplete. Messages acknowledged 511 is an icon representing the percentage of messages that the project monitoring application receives from the task holding individuals acknowledging that the task has been assigned to the individual. Completed tasks 513 is an icon representing the percentage of messages that the project monitoring application receives from the task holding individual indicating that the task has been completed by the individual. Overdue tasks 515 is an icon representing the percentage of tasks that have not been completed within a certain period of time. This period of time can be a time that is sent in project listing 111 indicating when the task should be completed. Messages sent 509 is an icon representing the percentage of messages sent, which is the number of distinct e-mails sent per task ID divided by the total number of tasks mentioned in project listing 111.

Figure 6:
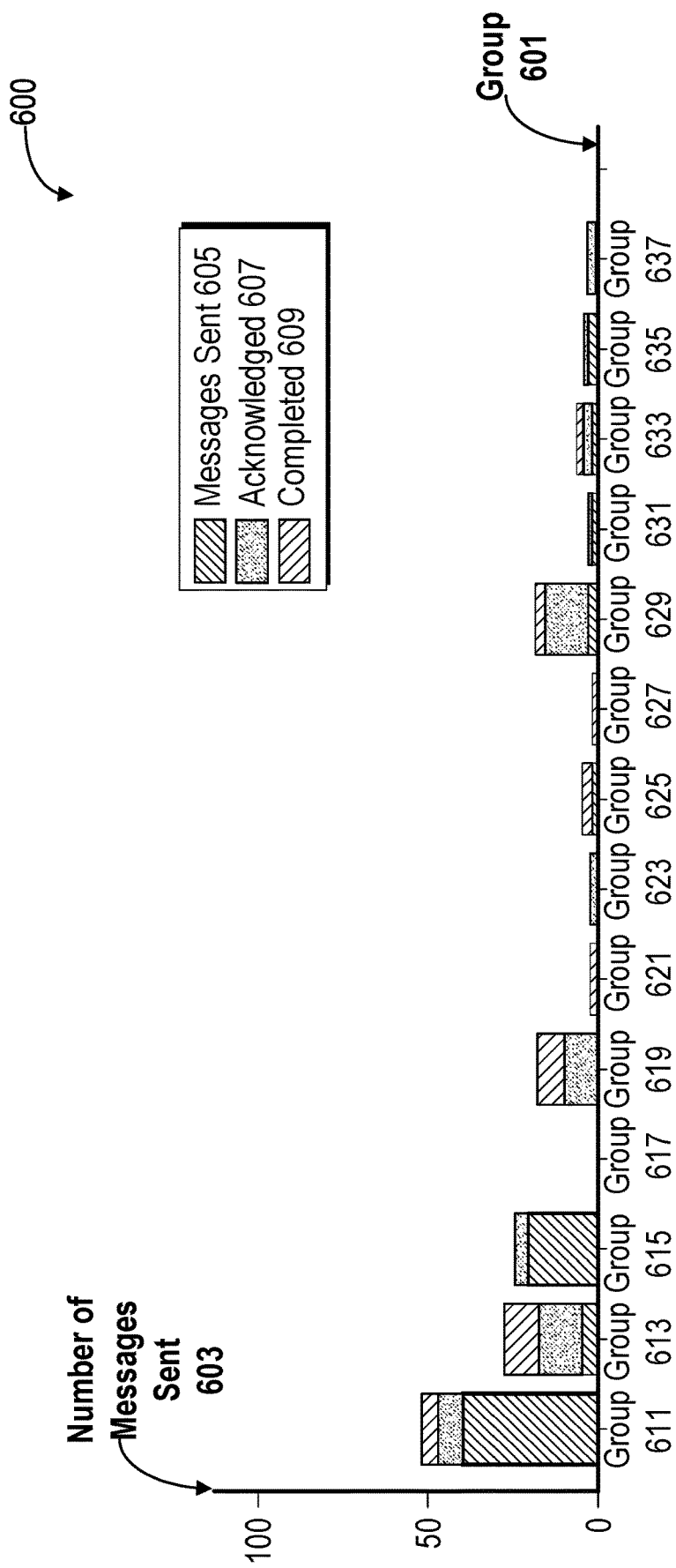
FIG. 6 is a project status GUI displaying the number of messages sent by group, according to an exemplary embodiment.

FIG. 6 is a project status graphical user interface GUI displaying the number of messages sent by group, according to an exemplary embodiment. The number of e-mails sent per group can be captured as a streamwise progress graph 600. Number of messages sent 603 indicates the number of e-mails sent per a given group (group 601). Number of messages sent 603 depicts the number of e-mails sent for three different e-mail types. Number of messages sent 603 includes the number of e-mails sent from the project monitoring application to the e-mail accounts of the task holding individuals (i.e., messages sent 605). This number represents the number of e-mails sent to all of the individuals in a given group excluding reminder e-mails, and escalation e-mails. Number of messages sent 603 includes the number of acknowledgement e-mails (i.e., acknowledged 607) sent from the individuals in a given group, to the project monitoring application, acknowledging that a task has been assigned to an individual in the group. Number of messages sent 603 also includes the number of completed e-mails (i.e., completed 609) sent from the individuals in a given group, to the project monitoring application, indicating that a task has been completed by an individual in the group.

FIG. 7 is a project task list graphical user interface (GUI), according to an exemplary embodiment. Upcoming tasks 703 is a GUI that can be viewed by project managers and/or task-holding individuals. Upcoming tasks 703 includes an entries icon (entries 701) that allows a user to select the number of rows to display. Upcoming tasks 703 also includes a search field (search 705) that can receive a string of characters that will cause the project monitoring application to search for the string of characters across the columns in upcoming tasks 703. Export as Project listing 707 is an icon that when clicked causes the project monitoring application to download the current status of project listing in a separate file in project manager device 103 or task holder client device 113. Task ID 709 is the task identifier for a particular task. Activity 711 is a summary of the task and/or information about the task. Start Date 713 is the date that an individual should start working on a task that is assigned to the individual. Start Time 715 is the time at which a task-holding individual should start working on a task that is assigned to the individual. Status 717 is the status of a task. The status of a task can be "Acknowledged", "Completed", or "Escalated". In some embodiments the status of the task can be "Yet to Begin", "Green-Light", or "Reminder-Sent". Doer 719 is the name of the individual to which the task is assigned. Stream 721 is the group that the task belongs to. For example, the group could be a finance group associated with accounts payable (AP) or a finance group associated with taxes. Track 723 is a track owner, or an individual who is responsible for managing a stream of a particular task. Mandatory 725 is a field that holds the task IDs of mandatory tasks required to be completed before the start of a particular task. Tasks that are interrelated via multiple dependencies can be separated by commas.

Figure 8:
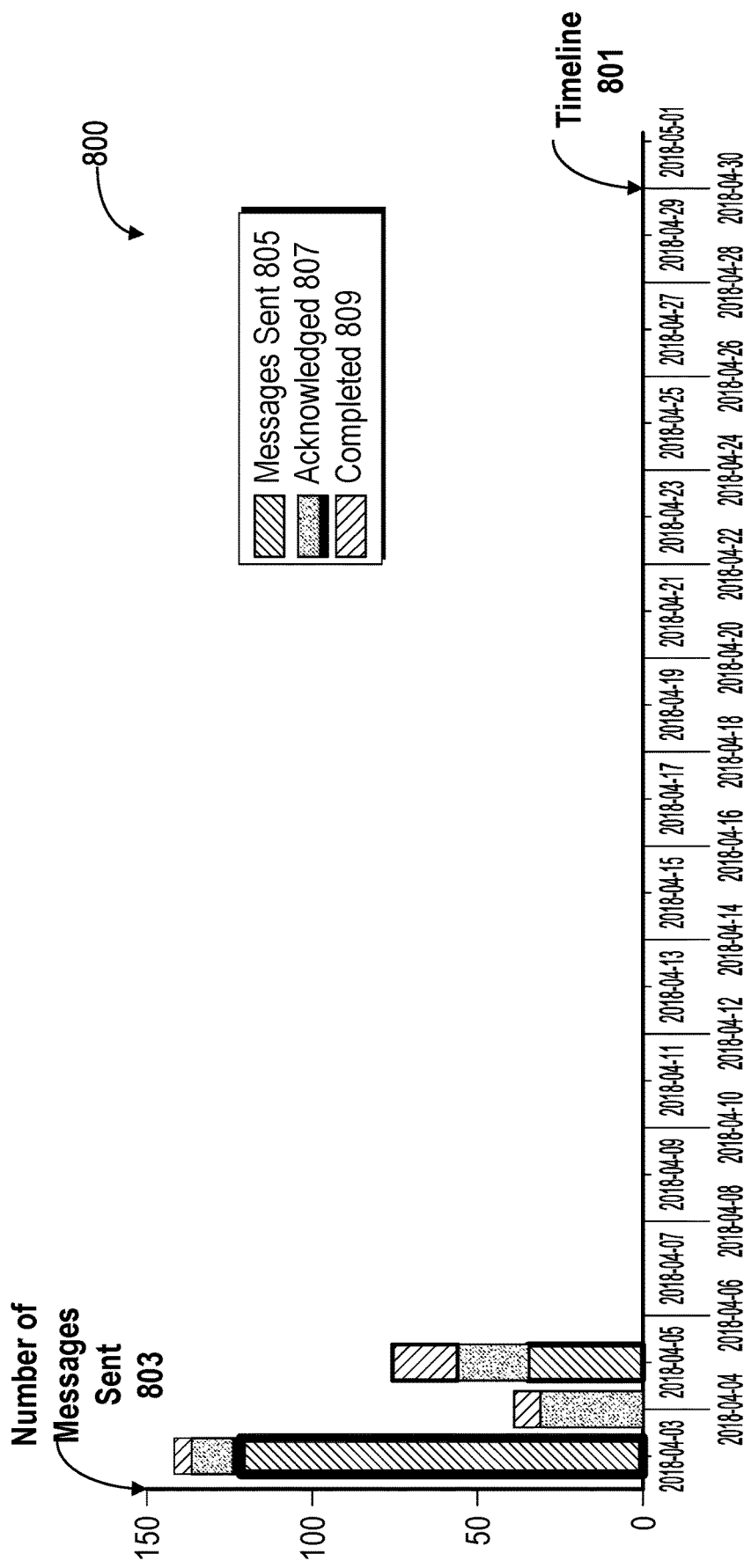
FIG. 8 is a project status GUI displaying the number of messages sent by time according to an exemplary embodiment.

FIG. 8 is a project status graphical user interface (GUI) displaying the number of messages sent by time, according to an exemplary embodiment. The number of e-mails sent over time can be captured as a timeline progress graph 800. Number of messages sent 803 indicates the number of e-mails sent over time (timeline 801). Timeline 801 is divided into twenty-four-hour blocks of time. For example, during the twenty-four-hour period of Apr. 3, 2018 to Apr. 4, 2018, 125 messages were sent (messages sent 805), 10 messages were acknowledged (acknowledged 807), and 5 messages indicating that a task was completed (completed 809) were sent. Number of messages sent 803 depicts the total number of distinct e-mails sent per task ID. Number of messages sent 803 includes the number of e-mails sent from the project monitoring application to the e-mail accounts of the individuals (i.e., messages sent 805). This number could represent the number of e-mails sent to the e-mail accounts associated with all of the individuals in a given group excluding reminder e-mails, and escalation e-mails during a twenty-four period. Number of messages sent 803 includes the number of acknowledgement e-mails (i.e., acknowledged 807) sent from the e-mail accounts associated with the individuals in a given group, to the project monitoring application, acknowledging that a task has been assigned to an individual in the group, during a twenty-four hour period. Number of messages sent 803 also includes the number of task completed e-mails (i.e., completed 809) sent from the e-mail accounts associated with the individuals in a given group, to the project monitoring application, indicating that a task has been completed by an individual in the group, during a twenty-four hour period.

Figure 9:
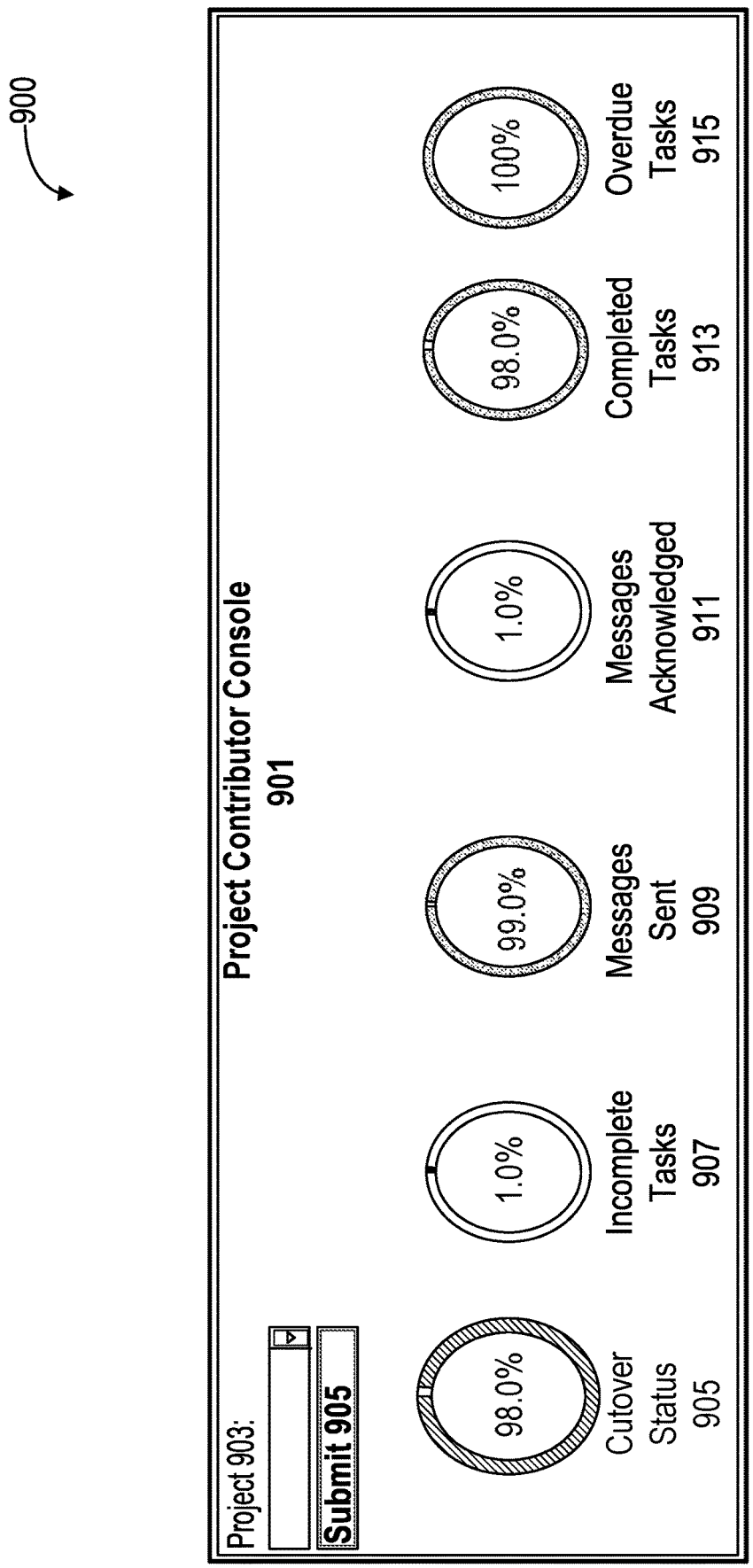
FIG. 9 is an updated project status graphical user interface (GUI) displayed for a project contributor, according to an exemplary embodiment.

FIG. 9 is an updated project status graphical user interface (GUI) displayed for a project contributor, according to an exemplary embodiment. Project contributor console 901 is a page providing updated information for a project (compare FIG. 5 at an earlier stage of a project). Project Contributor Console 901 includes an icon, submit 905, that once clicked causes the project monitoring application to load data for a project selected from drop down menu project 903, and display the status of tasks for a given project, as well as information about the e-mails sent between the project monitoring application and the e-mail accounts associated with the individuals. The project contributor console displays the latest task status based on project listing 111.

Project Contributor Console 901 includes an icon representing the status of a project indicated by cutover status 905. Cutover status 905 represents the percentage of a project that is complete. Because a project is a combination of tasks that must be completed in order for the project to be complete, cutover status 905 can also represent the completion of total tasks associated with the project. In this instance the percentage value displayed in cutover status 905 will be identical to the percentage value in completed tasks. Incomplete tasks 907 is an icon representing the percentage of tasks that are incomplete. Messages acknowledged 911 is an icon representing the percentage of message acknowledgements that the project monitoring application receives from an e-mail account associated with the individual to whom the task has been assigned. Completed tasks 913 is an icon representing the percentage of messages that the project monitoring application receives from an e-mail account associated with the individual indicating that the task has been completed by the individual. Overdue tasks 915 is an icon representing the percentage of tasks that have not been completed within a certain period of time. This period of time can be a time that is set in project listing 111 indicating when the task should be completed. Messages sent 909 is an icon representing the percentage of messages sent. The percentage can be equal to the number of distinct e-mails sent per task ID divided by the total number of tasks mentioned in project listing 111.

Figure 10:
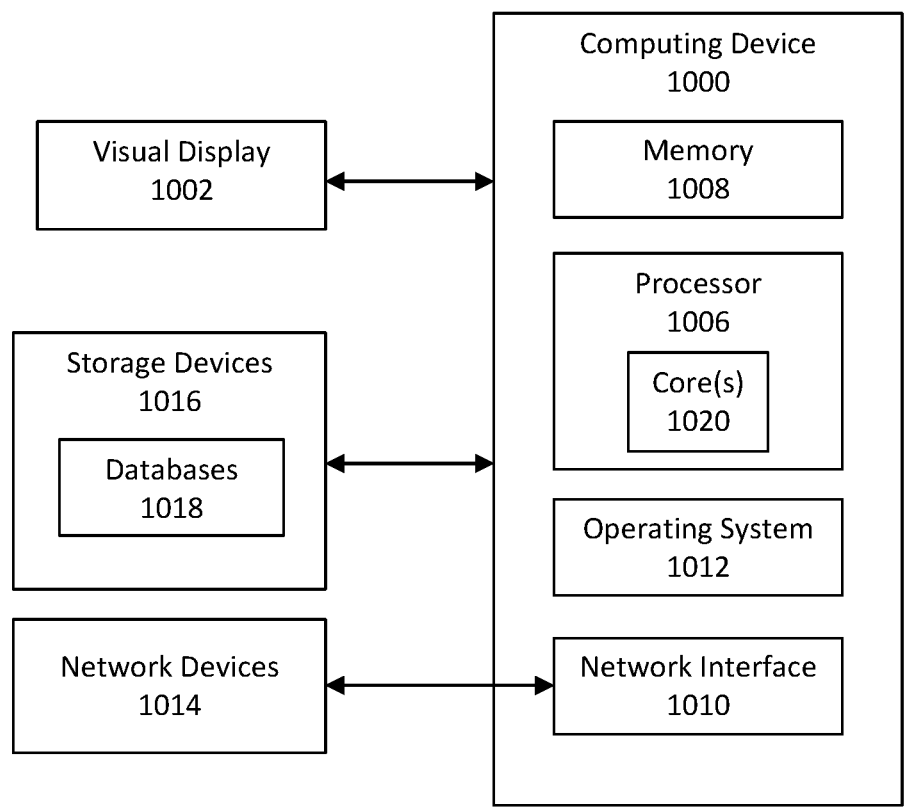
FIG. 10 is a block diagram of a computing device that can be used to implement the exemplary embodiments disclosed herein.

FIG. 10 is a block diagram of an exemplary computing device 1000 that can be used to perform one or more steps of the methods provided by exemplary embodiments. The computing device 1000 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. For example, memory 1008 included in the computing device 1000 can store computer-readable and computer-executable instructions or software for implementing exemplary embodiments. The computing device 1000 also includes processor 1006 and associated core(s) 1020, and optionally, one or more additional processor(s) (not shown), in the case of computer systems having multiple processors/cores, for executing computer-readable and computer-executable instructions or software stored in the memory 1008 and other programs for controlling system hardware. Processor 1006 and can be a single core processor or multiple core processor.

Memory 1008 can include a computer system memory or random-access memory, such as DRAM, SRAM, EDO RAM, and the like. Memory 1008 can include other types of memory as well, or combinations thereof. An individual can interact with the computing device 1000 through a visual display device 1002, such as a touch screen display or computer monitor, which can display one or more user interfaces for displaying data to a user (e.g., a display of a storage device in the distributed store connected to the computing device 1004 via network interface 1010 and software running on the storage device that is the cause of an error in imported data). The visual display device 1002 can also display other aspects, elements and/or information or data associated with exemplary embodiments. The computing device 1004 can include other I/O devices for receiving input from an individual, for example, a keyboard or another suitable multi-point touch interface, a pointing device (e.g., a pen, stylus, mouse, or track pad). The keyboard and the pointing device can be coupled to the visual display device 1002. The computing device 1004 can include other suitable conventional I/O peripherals.

The computing device 1004 can also include one or more storage devices 1016, such as a hard-drive, CD-ROM, or other computer readable media, for storing data and computer-readable instructions and/or software, such as one or more modules of the project management system environment 100 shown in FIG. 1 that implements exemplary embodiments of the system as described herein, or portions thereof, which can be executed to generate a graphical user interface (GUI), such as one or more of GUIs 400-900 on visual display device 1002. Exemplary storage devices 1016 can also store one or more databases for storing suitable information required to implement exemplary embodiments. The databases can be updated by an individual or automatically at a suitable time to add, delete or update one or more items in the databases. Exemplary storage devices 1016 can store one or more databases 1018 for storing provisioned data, and other data/information used to implement exemplary embodiments of the systems and methods described herein.

The computing device 1004 can include a network interface 1010 configured to interface via one or more network devices 1014 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1004 can include a built-in network adapter, network interface card, PCMCIA network card, card bus network adapter, wireless network adapter, USB network adapter, modem or another device suitable for interfacing the computing device 1004 to a type of network capable of communication and performing the operations described herein. Moreover, the computing device 1004 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1004 can run an operating system 1012, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 1012 can be run in native mode or emulated mode. In an exemplary embodiment, the operating system 1012 can be run on one or more cloud machine instances.

The description is presented to enable a person skilled in the art to create and use a computer system configuration and related method and systems for modifying capacity for a new retail facility. Various modifications to the example embodiments will be readily apparent to those skilled in the art, and the generic principles defined herein can be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. In other instances, well-known structures and processes are shown in block diagram form in order not to obscure the description of the invention with unnecessary detail. Thus, the present disclosure is not intended to be limited to the embodiments shown but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques can be used. Elements of different embodiments described hereinabove can be combined to form other embodiments not specifically set forth above and, further, elements described in the context of a single embodiment can be provided separately or in any suitable sub-combination. Accordingly, it is submitted that the scope of protection sought herein should not be limited to the described embodiments but rather should be limited only by the spirit and scope of the following claims.

We claim:

1. A project management system, comprising:
   an electronic project listing that lists a sequence of a plurality of tasks, at least some of the tasks having dependencies requiring a completion of an associated task before initiation, the project listing indicating a current status of each task in the plurality of tasks;
   a network-connected storage location configured to hold a plurality of messages;
   a plurality of client computing devices; and
   a computing device equipped with one or more processors and configured to execute a project monitoring application that when executed:
      retrieves information regarding the sequence of tasks associated with a project from the project listing;
      generates a display, on a display surface, of a dashboard graphical user interface (GUI) that includes one or more indicators corresponding to a current status of a first task in the sequence of tasks or a status of the entire project or both;
      receives input via the dashboard GUI to initiate the project;
      transmits a message directed to at least one individual assigned to the first task in the sequence of tasks following the received input;
      scans periodically the storage location at defined time periods for one or more first messages received from the individual via one of the plurality of client computing devices, the one or more first messages associated with the assigned first task;
      determines and updates the current status of the first task in the project listing based on the one or more first messages;
      updates the dashboard GUI to reflect the current status of the first task, a status of the entire project, or both; and
      sends a start task message to start a second task only after the assigned first task status is complete, and second task initiation is dependent upon completion of the first task and a second task start date is not in the future;
   wherein the project monitoring application, when executed, is configured to not send the start task message regarding initiation of the second task prior to completion of the first task;
   wherein the project monitoring application, when executed, is configured to send reminder messages at predetermined intervals following sending of the start task message regarding the first task until an acknowledgement is received, the project monitoring application configured to stop sending reminder messages regarding the first task when an acknowledgement is received and to not send reminder messages regarding the second task before the first task is completed.

2. The project management system of claim 1, wherein the project monitoring application when executed further:
   scans the designated storage location at least twice a day.

3. The project management system of claim 2 wherein, the project monitoring application when executed further:
   scans the designated storage location once every minute while the project monitoring application is executing.

4. The project management system of claim 1, wherein the one or more first messages and reminder messages are emails.

5. The project management system of claim 1, wherein the project monitoring application when executed further:
   increases a frequency of the reminder messages from a first frequency to a second frequency in response to received input via the dashboard GUI.

6. The project management system of claim 1, wherein the project includes groups of tasks respectively assigned to a plurality of teams that include two or more individuals.

7. The project management system of claim 6, wherein the dashboard GUI displays a status of the groups of tasks.

8. The project management system of claim 1, wherein the GUI comprises a percentage of messages sent icon, the percentage of messages sent icon displaying the number of distinct emails sent per task ID divided by a total number of tasks in the project.

9. A method, the method comprising:
providing a sequence of tasks associated with a project in a project listing, the sequence of tasks assigned to a plurality of individuals, at least some of the tasks having dependencies requiring a completion of an associated task before initiation;
generating a display of a dashboard graphical user interface (GUI) comprising one or more indicators corresponding to a status of a first task in the sequence of tasks, a status of the entire project, or both;
receiving input via the dashboard GUI to initiate the project;
transmitting a message directed to at least one individual assigned to the first task following the received input;
scanning periodically a designated storage location at defined time periods for one or more first messages received from the at least one individual via one of the pluralities of client computing devices, the one or more first messages associated with the assigned first task;
determining and recording the status of the first task based on the one or more first messages;
updating the dashboard GUI to reflect the status of the first task, a status of the entire project, or both; and
sending a start task message to start a second task only after the assigned first task status is complete, and second task initiation is dependent upon completion of the first task;
not sending the start task message regarding initiation of the second task prior to completion of the first task;
sending reminder messages at predetermined intervals following sending of the start task message regarding the first task until an acknowledgement is received stopping sending reminder messages regarding the first task when an acknowledgement is received, and not sending reminder messages regarding the second task before the first task is completed.

10. The method of claim 9, the method further comprising:
scanning the designated location at least twice a day.

11. The method of claim 10, further comprising:
scanning the designated storage location every minute while the project monitoring application is executing.

12. The method of claim 9, wherein the one or more first messages and reminder messages are emails.

13. The method of claim 9, the method further comprising:
increasing a frequency of the reminder messages from a first frequency to a second frequency.

14. The method of claim 9, wherein the project includes groups of tasks respectively assigned to a plurality of teams that includes two or more individuals.

15. The project management system of claim 1,
wherein the plurality of tasks comprises at least three tasks to be performed in a sequential order, the first task to be followed by the second task to be followed by a third task; and
wherein the project monitoring application when executed further: sends a start task message to start the third task only after the first assigned task status and a second assigned task status are indicated as being complete.

16. The project management system of claim 1, wherein the project monitoring application when executed further:
sends an initial message to an account to instruct an individual to begin working on a task only after any preceding task in the sequence of the plurality of tasks is completed.

* * * * *